United States Patent [19]

Dawson

[11] Patent Number: 5,254,008

[45] Date of Patent: Oct. 19, 1993

[54] DEVICE FOR TEACHING MUSIC

[76] Inventor: Beverley G. Dawson, 96 Pembroke Street, Kingston, Canada, K7L 4N7

[21] Appl. No.: 933,653

[22] Filed: Aug. 24, 1992

Related U.S. Application Data

[63] Continuation-in-part of Ser. No. 674,119, Mar. 25, 1991, abandoned.

[51] Int. Cl.$^5$ .............. G09B 25/00; G09B 13/00; G09B 15/02
[52] U.S. Cl. ..................... 434/427; 434/227; 84/471 R
[58] Field of Search ............ 434/427, 227, 231; 84/471, 472, 478, 473

[56] References Cited

U.S. PATENT DOCUMENTS

| | | | |
|---|---|---|---|
| 2,347,950 | 5/1944 | Huish | 84/478 |
| 3,530,758 | 9/1970 | Stillo | 84/471 |
| 3,616,723 | 11/1971 | Gullickson | 84/478 |
| 4,054,079 | 10/1977 | Sohler | 84/423 |
| 4,434,698 | 3/1984 | Oberlander | 84/483 A |
| 4,444,083 | 4/1984 | Apel et al. | 84/423 R |
| 4,464,971 | 8/1984 | Dean | 84/471 R |
| 4,885,969 | 12/1989 | Chesters | 84/1.01 |

*Primary Examiner*—Gene Mancene
*Assistant Examiner*—Cindy A. Cherichetti
*Attorney, Agent, or Firm*—Richard J. Hicks

[57] ABSTRACT

A simple teaching kit for use by music teachers and students at any level to illustrate the theory of music. The kit comprises representations of the treble and bass clefs and two octave sections of a piano keyboard in combination with a plurality of transparent overlays upon which the student selectively affixes a plurality of coloured stickers representing any selected scale, tonal pattern or chord pattern in any selected key.

4 Claims, 2 Drawing Sheets

DEVICE FOR TEACHING MUSIC

CROSS REFERENCE TO RELATED APPLICATION

This application is a continuation-in-part of earlier filed application Ser. No. 07/674,119 filed Mar. 25, 1991 and now abandoned.

FIELD OF THE INVENTION

This invention relates to an apparatus for aiding the teaching of music theory and more particularly to a simple apparatus to assist music teachers to teach pupils from the basic to the advanced level.

BACKGROUND OF INVENTION

The musical alphabet is conventionally written as C,D,E,F,G,A,B,C and the notes represented thereby from C to C are termed an "octave". This octave pattern is repeated in a number of different "keys" or "scales", depending upon the pitch or frequency of the acoustical vibration. The lowest note or first note names the "key". The 1st, 3rd, and 5th notes of the scale may be played together to form a "chord". This pattern is also repeated in all of the keys. In Western music there are two familiar modes of music known as the major (Ionian) and the minor (Aeolian) modes from which major and minor scales may be derived. Each mode comprises a series of scales known as diatonic scales, one of which is the scale of C major. Each scale comprises a series of seven steps rising from one note or key to its octave such as the C to C octave of the C major scale referred to above. The step or interval between the notes in a scale is either a tone or a semitone apart. Each mode of music has its own characteristic sequence of tone/semitone steps between successive notes of its scales.

Another way to describe the relationships of note pitch is the tone/semitone relationship. An octave has 12 semitones. Two semitones make a tone. A semitone is the interval between every note on a piano, black to white to black or white to white where there is no black. The arrangement of these semitones combined with the tones determines whether the scale constitutes either a major or minor mode. All major scales can be built using the Tonal Pattern for C major below.

The major mode can be characterized thus (for C major):

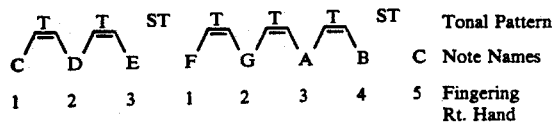

All minor scales can be built using the Tonal Pattern for A minor below.

The minor mode can be characterized thus (for A minor):

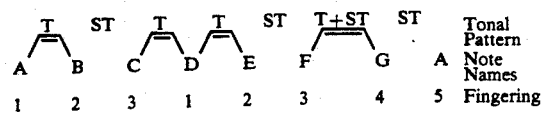

It will be appreciated that that the note names and fingering patterns will change for different scales in both modes. These concepts are relatively difficult for music pupils, and particularly young pupils to grasp. Visual aids have therefore, been suggested. Attention is directed to U.S. Pat. No. 4,881,443 issued Nov. 21, 1989 to H. W. Bertram which describes an apparatus having a display base with a circular display disc rotatably associated with the base and a display associated with the base and a display keyboard moveable relative to the display base. The base, the disc and the keyboard are all inscribed with indicia to enable the student to study and compute chords and scales in any presented mode of music. This device is however, relatively complex and presents far more information than can be readily assimilated by young or begining music students. There is, therefore, a need for a very simple visual aid which can be used by the teacher and pupil alike to study with provision to expand as the pupil becomes more advanced. Preferably the aid should be in the form of a kit so that each pupil can have a personal set for the self completion of assignments and private study. This visual aid enables the student to learn by doing. The devices of the prior art, as illustrated by U.S. Pat. No. 4,881,443, are ready made and involve no student assembly.

OBJECT OF INVENTION

Thus, it is one object of the present invention to provide a visual aid, in the form of a kit, for the teaching of musical theory which can be used by any student from the very basic to the advanced level.

BRIEF STATEMENT OF INVENTION

By one aspect of this invention there is provided a music teaching apparatus comprising a planar representation of a half-staffboard, a planar representation of a partial keyboard, a series of transparent overlays and a plurality of sticker elements of selected colours, each selectively arrangable and permanently mountable on any selected said overlay so as to provide a permanent pattern thereon and overlie a selected one of said half-staffboard and said partial keyboard.

DETAILED DESCRIPTION OF PREFERRED EMBODIMENTS

Figure 1:
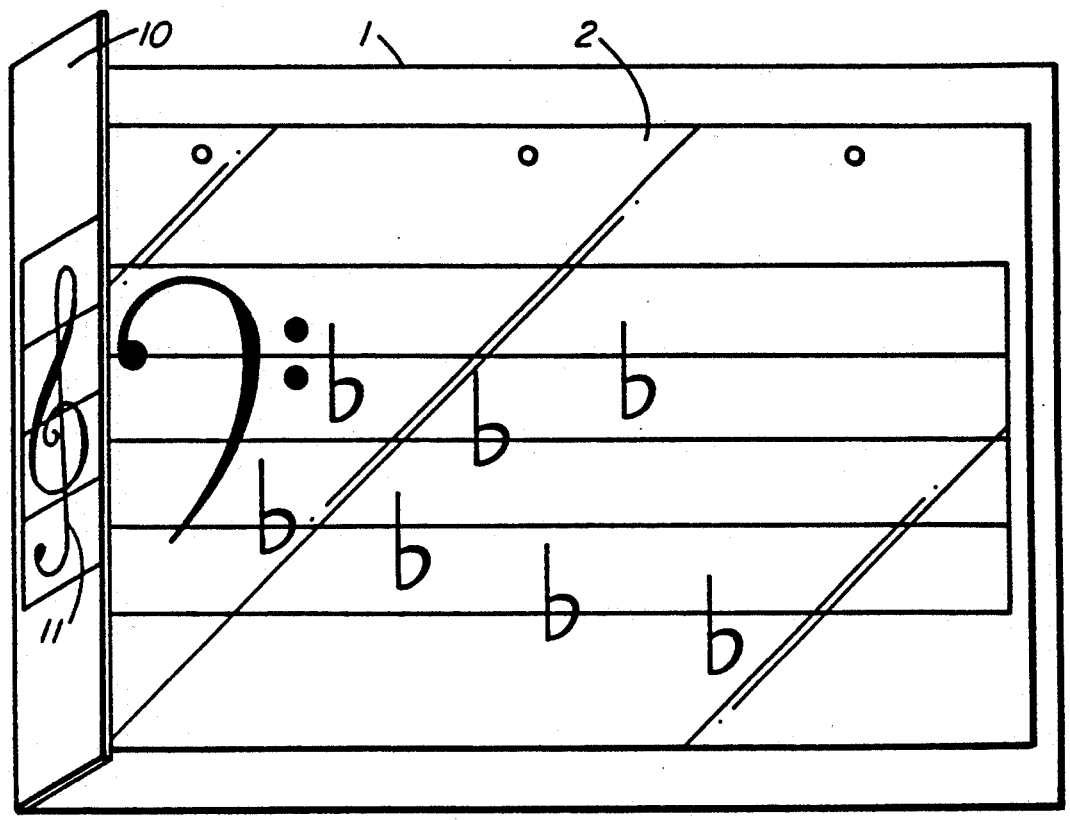
FIG. 1 is a sketch of a staffboard teaching device embodying the present invention; showing bass clef with a key signature overlay for C flat major.
Figure 2:
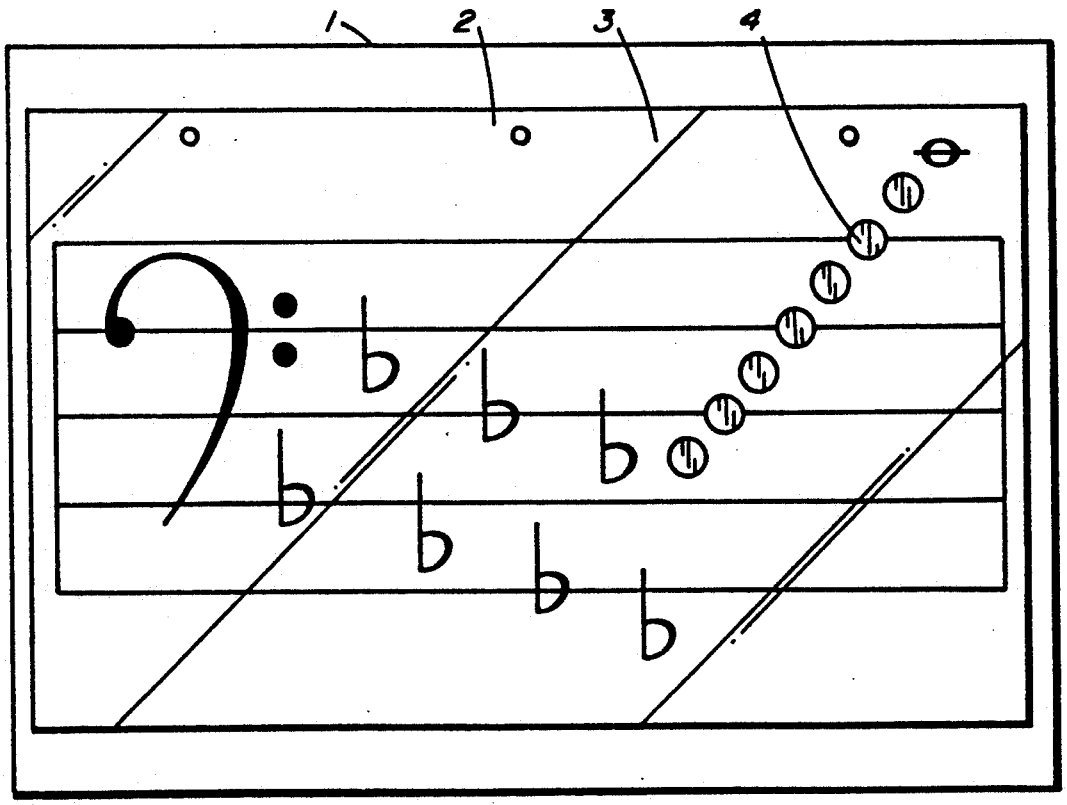
FIG. 2 is a sketch, similar to FIG. 1 showing C flat major scale with the key signature overlay as in FIG. 1. overlay.

In FIG. 1 there is shown a planar sheet 1, preferably of card stock, having imprinted thereon a representation of the bass clef. Either on a separate sheet 10 and hinged to the planar sheet 1 or on the reverse of sheet 1 there is provided a representation of the treble clef sign 11. These sheets 1 are used in conjunction with two transparent key signature overlay sheets 2 for sharps (#) and flats (♭). In FIG. 1 the base clef is shown with the flats overlay so that it represents a G flat major key signature. The key signature sheets may be pre-printed or may be built up with an erasable pen by the student as part of his/her studies. The key signature sheets are not, therefore, an essential integer of the present invention, but are merely preferred. The staffboard sheet 1 is then used in conjunction with a C flat major scale overlay, as shown in FIG. 2. The scale overlay comprises a transparent overlay 3 upon which the student places a plurality of stickers 4 of selected colour according to the scale which is desired. It will be appreciated that one scale overlay will suffice for all scales, regardless of key. This is possible because the same overlay is moved up and down the staffboard to the appropriate starting note for the chosen scale. Variations on this process on the staffboard may also be used to illustrate chromatic (half tone) patterns as well as atonal (whole tones) patterns and for the development of chords for any key. It is important that each student should build up his/her own individual library of scales: chromatic, atonal, major and minor, and chord patterns and other musical patterns as part of his/her musical education. As it is necessary to illustrate how the scales, chords and chromatic patterns may go up or down relative to the staff, it is desirable that the overlays be movable, i.e. now secured in any way to the staffboard which is in itself kept stationary. For convenience, the transparent staffboard overlays 3 and 4, once prepared, are stored in envelopes, a binder or a box of suitable size and individually accessible by identification tags.

Figure 3:
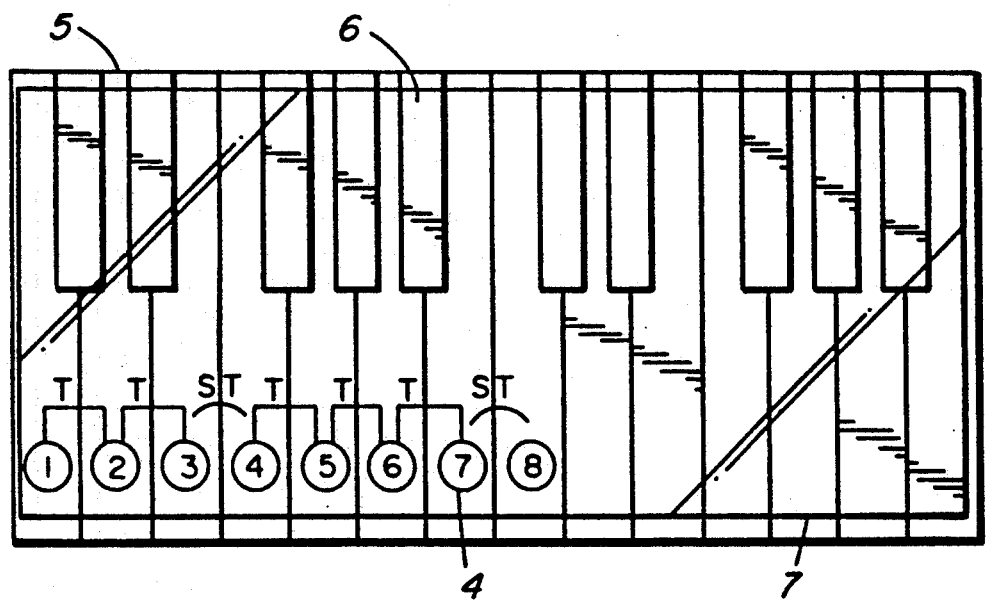
FIG. 3 is a sketch of a partial keyboard teaching device embodying the present invention, showing a tonal pattern overlay for C major.
Figure 4:
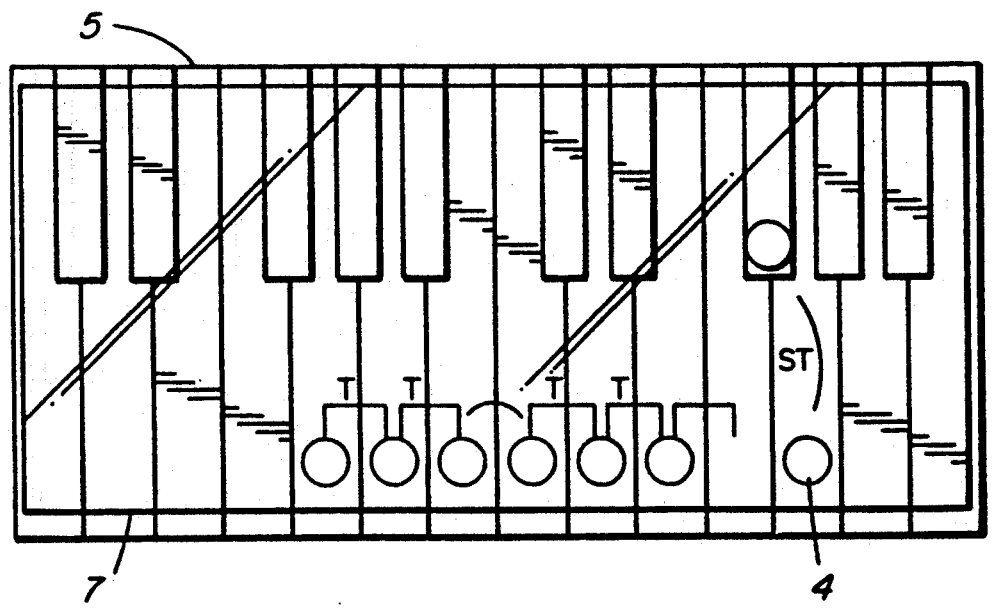
FIG. 4 is a sketch of a keyboard teaching device as in FIG. 2 with the tonal pattern for C Major used to establish the G Major scale.

The second part of the kit of the present invention comprises a planar sheet 5 having imprinted thereon a portion of a standard piano keyboard 6, as shown in FIG. 3. Sheet 5 is used in conjunction with a planar transparent overlay 7 upon which the student permanently affixes a plurality of coloured adhesive stickers or markers, such as circles, in the appropriate pattern for a particular scale and key. It is important that once affixed the markers are not easily removed as with magnetic or "Velcro" markers such as have been used in the prior art. FIG. 3 shows the tonal pattern for the scale of C Major and FIG. 4 shows the tonal pattern for the scale of G Major. It will be appreciated that a total of 28 overlays will be necessary to build up a complete set of scales for all of the major and minor scales in all keys which then form a permanent record. In addition, overlays for chromatic (half tone/step) patterns and atonal (whole tone/step) patterns can be produced. Beginning students and very young students may not require a whole set—often a chromatic, an atonal, 4 major and 4 minor scales and some chord patterns will suffice. Supplementary kits designed for various levels (Beginer, Intermediate, and Advanced) could be developed with the appropriate quantity of materials in each. The construction and composition of each kit could be designed to supplement the previous one. The invention would thereby be beneficial to students of all ages and skill levels, and expand as their ability advances. Advanced theory students can be encouraged to make up a whole set.

I claim:

1. A music teaching apparatus comprising:
   a planar representation of a keyboard;
   a transparent, planar sheet having printed thereon a representation of at least a half staffboard;
   a first plurality of transparent planar sheets adapted to be positioned in a selected overlying relationship to said keyboard;
   a second plurality of transparent sheets adapted to be moved in planar parallel overlying sliding relationship to said staffboard; and
   a plurality of sticker elements of selected colour, each selectively arrangeable and permanently mountable on any selected said sheet of said first and second plurality of transparent sheets so as to provide a permanent pattern thereon and overlie said staffboard and said keyboard.

2. A music teaching apparatus as claimed in claim 1 including storage means for said overlays.

3. A music teaching apparatus as claimed in claim 1 wherein said staffboard includes a treble clef and a bass clef.

4. A music teaching apparatus as claimed in claim 1 wherein said pattern is selected from a scale pattern, a chord pattern and an interval pattern.

* * * * *